S. DEMPSEY.
CHOCOLATE CANDY COOLER.
APPLICATION FILED JUNE 27, 1921.
1,414,553.
Patented May 2, 1922.
2 SHEETS—SHEET 1.
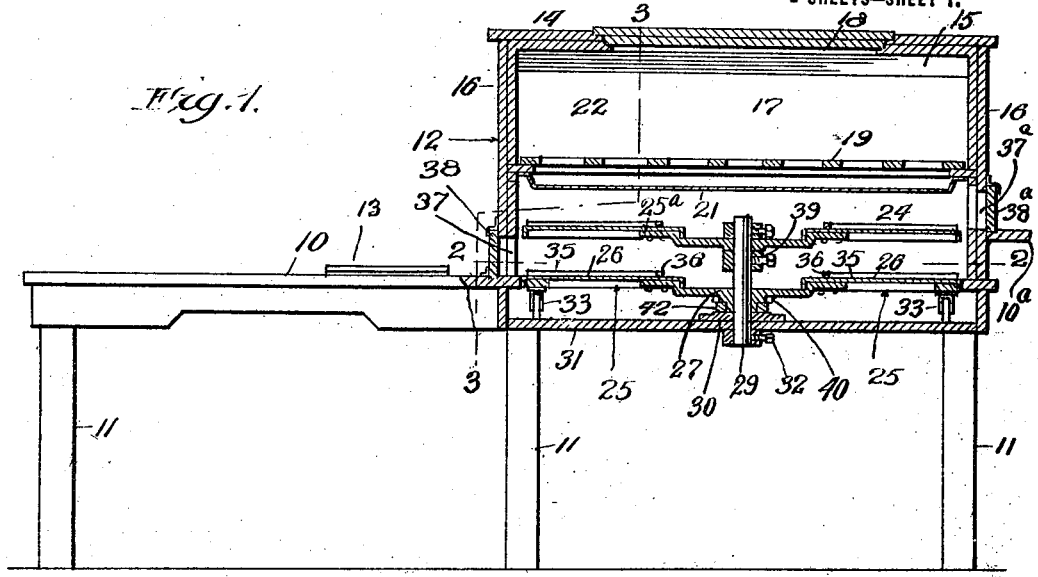
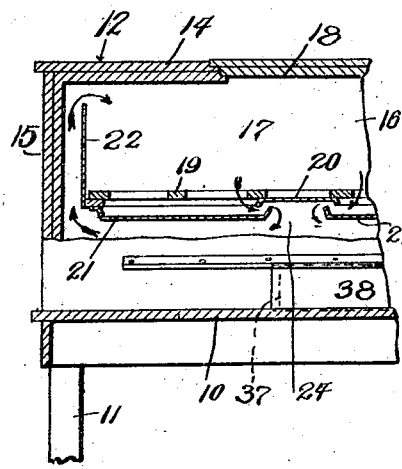
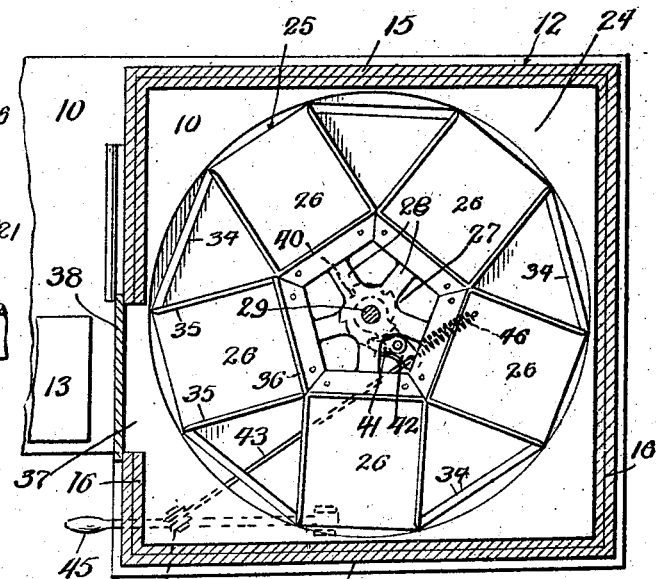
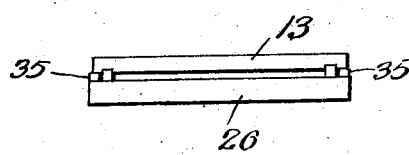
Inventor:
Senterlow Dempsey
by Charles O. Shirvey
his Atty.

S. DEMPSEY.
CHOCOLATE CANDY COOLER.
APPLICATION FILED JUNE 27, 1921.
1,414,553.
Patented May 2, 1922.
2 SHEETS—SHEET 2.
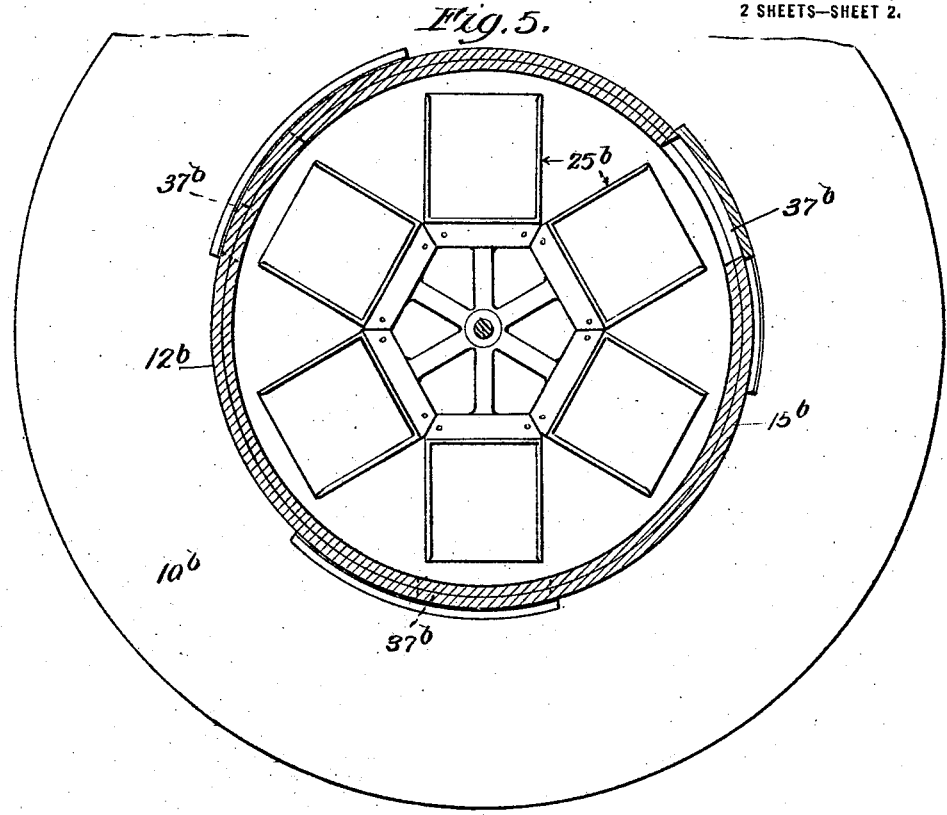
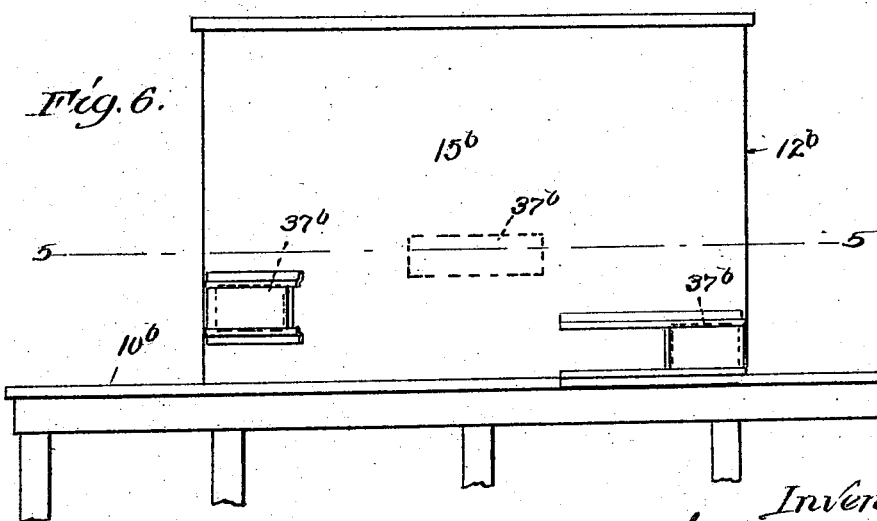

UNITED STATES PATENT OFFICE.

SENTERLOW DEMPSEY, OF CHICAGO, ILLINOIS.

CHOCOLATE-CANDY COOLER.

1,414,553.

Specification of Letters Patent.  Patented May 2, 1922.

Application filed June 27, 1921. Serial No. 480,516.

*To all whom it may concern:*

Be it known that I, SENTERLOW DEMPSEY, a citizen of the United States, and a resident of Chicago, Cook County and State of Illinois, have invented certain new and useful improvements in Chocolate-Candy Coolers, of which the following is declared to be a full, clear, and exact description.

This invention relates to candy coolers and its principal object is to provide a cooler of this class of simple, efficient and practical construction, having a large capacity for a given size, wherein one or more attendants may place fresh uncooled candy in the cooler, independently of each other, and each attendant may remove the candy (placed in the cooler by him) after it has remained in the cooler for a sufficient length of time to properly cool and set or harden. The invention consists in the several novel features hereinafter fully set forth and claimed.

The invention is clearly illustrated in the accompanying drawing, in which:—

Fig. 1 is a view of a chocolate candy cooler embodying a simple form of the invention, the view being partly in side elevation and partly in vertical longitudinal section; Fig. 2 is a horizontal section taken on line 2—2 of Fig. 1; Fig. 3 is a vertical cross-section taken on line 3—3 of Fig. 1, with certain portions broken away; Fig. 4 is a detail end view of a shelf section and tray; Fig. 5 is a horizontal section through a modified form of the invention taken on line 5—5 of Fig. 6 and Fig. 6 is a side elevation thereof.

Referring to said drawings, and first to Figs. 1 to 4, inclusive, the reference character 10 designates a table, supported by legs 11 and having at one end a cabinet 12 extending up therefrom. Said table 10 furnishes a convenient work bench for the attendant to prepare the chocolate candies and place them on the trays (one of which is seen at 13, Figs. 2 and 4) that are to be placed in the cooling chamber of the cabinet 12.

Said cabinet 12 comprises a boxlike structure having top 14, sides 15, and ends 16; the bottom may be formed by the table 10. The upper part 17 of the cabinet is arranged to act as an ice compartment, and an opening is provided in its top 14 which opening is closed by a lid or cover 18. An openwork partition or grating 19, supported by the sides and ends of the cabinet, supports the ice in the ice compartment, and a water shed 20 and drip pans 21 take care of the water, as the ice melts. The water is discharged from the drip pans by waste pipes as usual. Flues are provided at the sides of the cabinet for the ascending air, and said flues may be formed by providing vertical partitions 22 that extend from the grating 19 to a place adjacent the top of the cabinet. The cold air passes down around the water shed and drip pans and into the cooling chamber 24 therebelow, and the warmer air ascends through the flues at the sides of the cabinet, thus the cold air continually circulates through the cooling chamber, maintaining therein a practically uniform cold temperature, suitable for the purpose intended.

In the cooling chamber 24 is a rotating shelf 25, or there may be several rotating shelves 25, 25$^a$ therein, one located above the other. Preferably in cases where one shelf 25 is used, its upper face is made flush with the upper face of the table 10, the latter in such case being cut out on a circular line to receive the rotatory shelf 25. For the sake of economy, lightness and convenience in construction, and to obtain greater freedom of circulation the shelf 25 is made up of a plurality of similar shelf sections 26 and a hub portion 27, having spokes or arms 28, radiating therefrom, to which the shelf sections 26 are secured. The hub portion 27 surrounds a post or stem 29, and is free to rotate thereon; it rests on a bearing collar 30 secured on a bottom wall or floor 31. The post or stem 29 is preferably secured to the collar 30 by a set screw 32. If desired, casters 33 may be secured to the undersides of the rotatory shelf 25 near its outer edge, to run on the bottom floor 31 and carry the weight of the shelf and its contents. The outer ends of the several shelf sections are connected to each other by struts 34 to give rigidity to the shelf and to furnish means whereby the shelf may be readily turned by the attendant.

If desired, each shelf section 26 may have guide rails 35 secured on its upper face, between which the trays 13 may be placed, and a strip 36 may be placed at the far end of each shelf section to act as a stop for the tray.

In the end wall 16, adjacent the exposed portion of the table 10, is an opening 37 through which filled trays may be inserted into the cooling chamber and placed on the shelf sections 26, and a door or cover 38 is provided for said opening 37 to keep it closed, except when the attendant inserts a tray into the cooling chamber, and removes one therefrom. Said door opening 37 is placed at a convenient place adjacent the attendant's station.

Means for rotating the shelf 25 from a position outside of the cabinet is provided and, as shown, comprises a pawl and ratchet mechanism, associated with the shelf and connected to a lever or treadle outside the cabinet by any suitable connecting device. In the drawing, the ratchet disc 40 is formed on the underside of the hub portion 27 of the shelf 25 and it has the same number of ratchet teeth as there are shelf sections 26. The pawl 41 is carried by an arm 42 mounted on a reduced part of the hub 27 and is spring pressed toward the ratchet teeth as is customary in pawl and ratchet mechanism. A flexible connection, as for instance a cable chain or the like 43, is secured to the arm 42 and runs over a pulley 44 and down through the floor 31, beyond which it is secured to a hand lever or foot treadle 45. A spring 46 secured to the arm 42 and to the floor 31 serves to return the arm and pawl to normal positon, after having been moved by the lever 45 in turning the shelf.

In cases where more than one rotatory shelf is used in the cooling chamber, the other shelf 25$^a$ or shelves are placed above the shelf 25 and properly spaced therefrom. Such additional shelf may be rotatively supported by a collar 39 secured to the post 29. The door opening 37$^a$ to the table 25$^a$ is preferably made in the end wall 16 opposite to the one containing the opening 37, or in a side wall, and is closed by a door 38$^a$. Said door opening 37$^a$ is placed at a higher level than the opening 37, so as to be in front of the shelf 25$^a$. A separate table 10$^a$, or one forming part of the structure, may be provided for the attendant working at the side containing opening 37$^a$, and said table is preferably raised sufficiently to bring its upper face flush with the upper face of the shelf 25$^a$.

In the operation of the cooler, the candy, chocolate, centers, racks, trays and other paraphernalia used by an attendant are placed on the table 10, and the attendant prepares the chocolate candies, and places them on a tray 13 which, when filled, is inserted into the cooling chamber and placed on an adjacent shelf section 26 and the shelf given a partial revolution to bring the next adjacent shelf member into juxtaposition with respect to the opening 37. The door is then closed and another tray filled with candy and inserted into the cooling chamber and placed on the shelf section behind the opening 37, the shelf moved another step and the door closed. When the first filled tray has been moved around to the opening 37, it is removed from the shelf and a tray of uncooled candy placed on the shelf, and so on. The parts are so proportioned, and the air in the cooling chamber is kept at such a degree of temperature, that the candies on a tray are properly cooled from the time they are inserted into the cooling chamber and pass around to the opening 37, during the filling of other trays for the remaining shelf sections.

The attendant rotates the shelf by reaching in through the opening 37 and pushing the shelf around, and when the other shelf rotating means is employed, he presses down on the lever 45, thereby rotating the shelf one step and bringing an adjacent shelf section in juxtaposition with the opening 37.

In the modified form of the invention illustrated in Figs. 5 and 6, the upright wall 15$^b$ of the cabinet 12$^b$ is made circular in form, which provides for a large number of openings 37$^b$, thereby providing for a large number of attendants for the one machine. Three openings 37$^b$ are shown, but it is obvious that a great many more may be had. These openings are disposed at different heights, and the rotary shelves 25$^b$ are placed one above the other, as before. A work table 10$^b$ may extend around the cabinet 12$^b$, and additional tables may be used to accommodate the material and paraphernalia for the attendants.

While the cooler has been designed particularly for cooling chocolate candies, it is to be understood that its use is not confined thereto, as it may be used for cooling or hardening other candies.

More or less variation of the exact details of construction is possible without departing from the spirit of this invention; I desire, therefore, not to limit myself to the exact form of the construction shown and described, but intend, in the following claim, to point out all of the invention disclosed herein.

I claim as new and desire to secure by Letters Patent:

A candy cooler comprising a cabinet, having an ice compartment and a cooling chamber therebelow, and a plurality of tray receiving shelves rotatively mounted, one above the other, in said chamber, and independently movable therein, there being openings in the wall of said chamber for access to individual shelves, and disposed at different levels around the chamber in front of said shelves.

SENTERLOW DEMPSEY.